April 25, 1933. W. F. EGGER ET AL 1,905,825
MACHINE FOR HONING AND POLISHING CRANK SHAFTS
Filed July 18, 1927 15 Sheets-Sheet 3
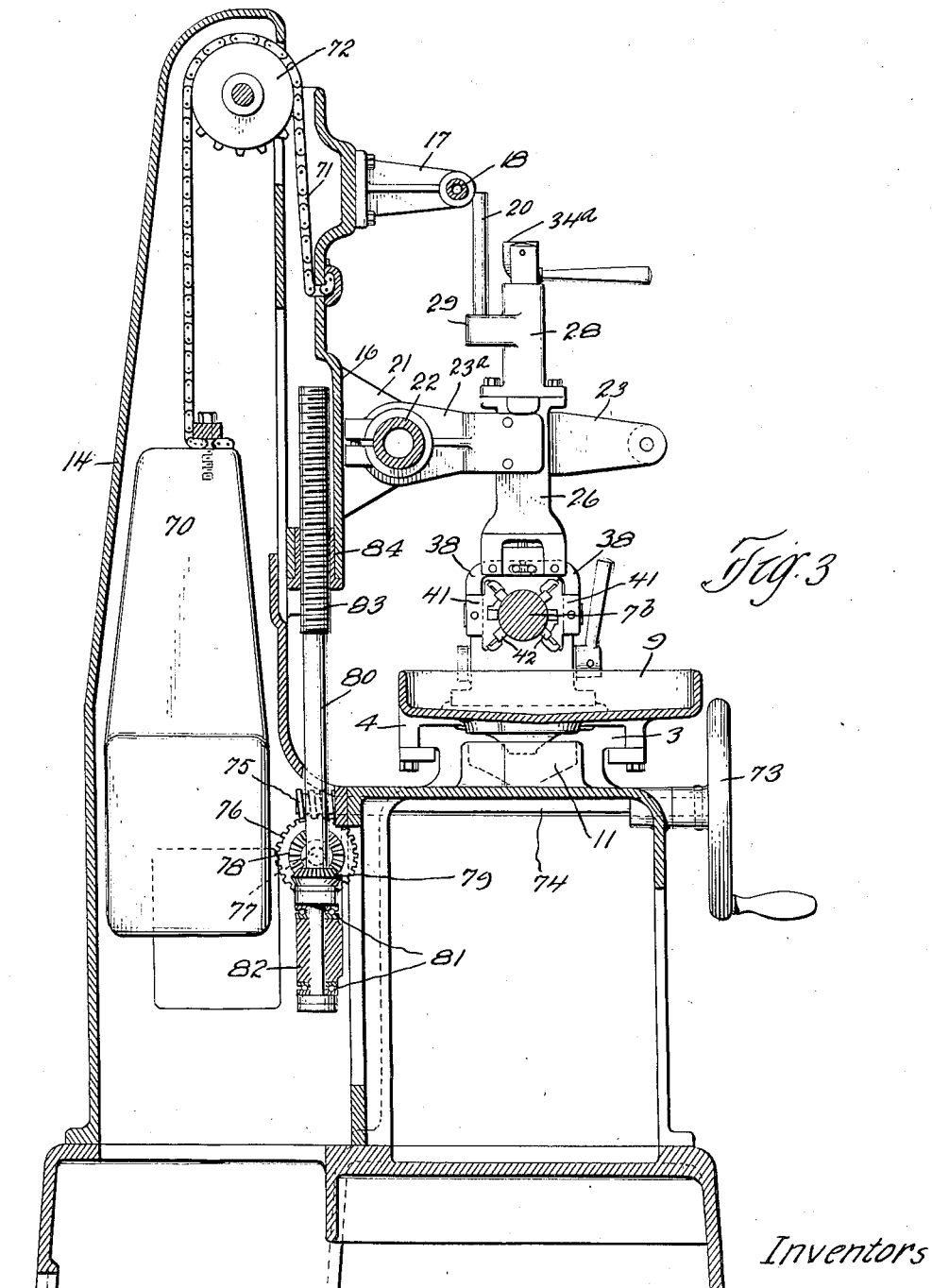
Inventors
W. F. Egger and
L. A. Becker
By Hull, Brock West
Attys.

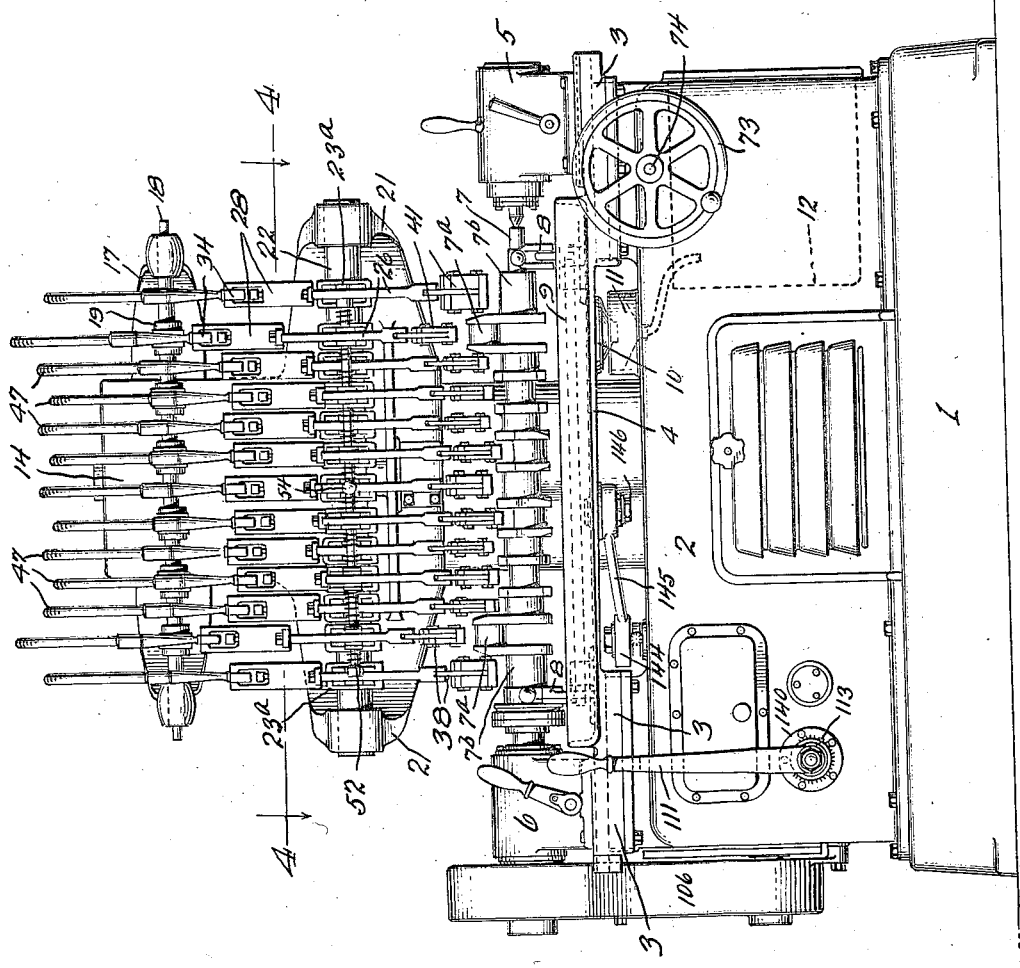

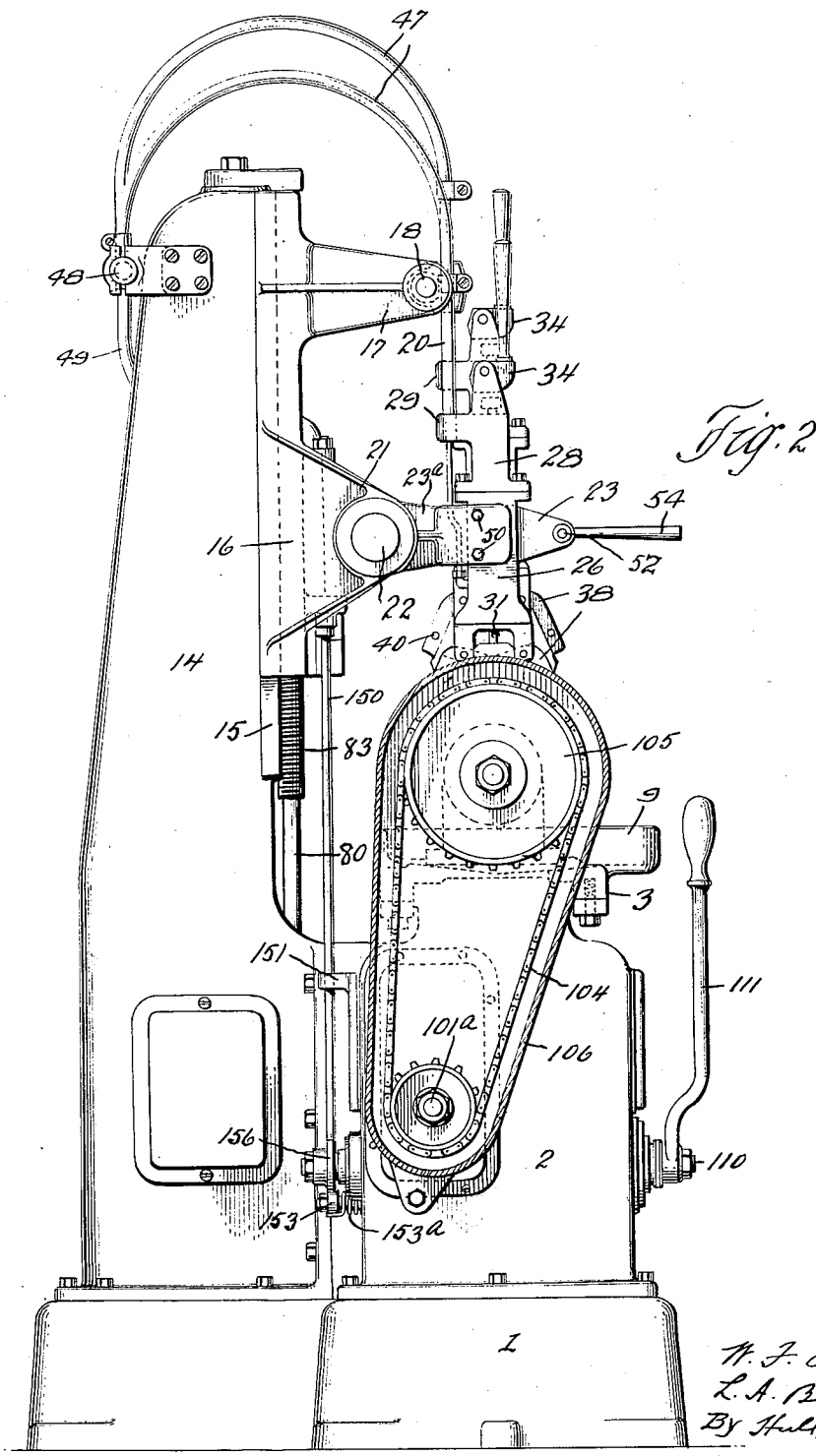

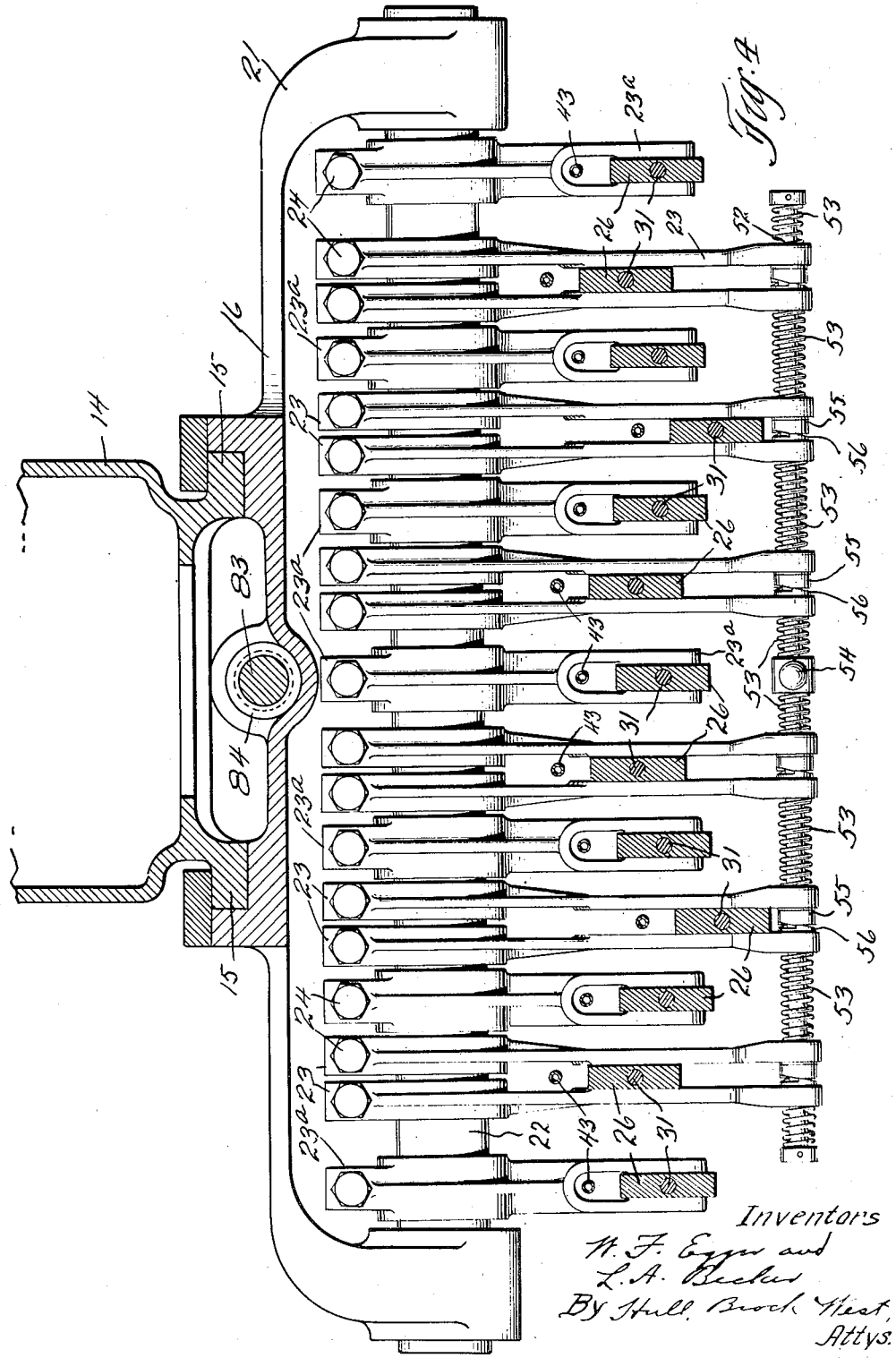

April 25, 1933.  W. F. EGGER ET AL  1,905,825
MACHINE FOR HONING AND POLISHING CRANK SHAFTS
Filed July 18, 1927   15 Sheets-Sheet 5
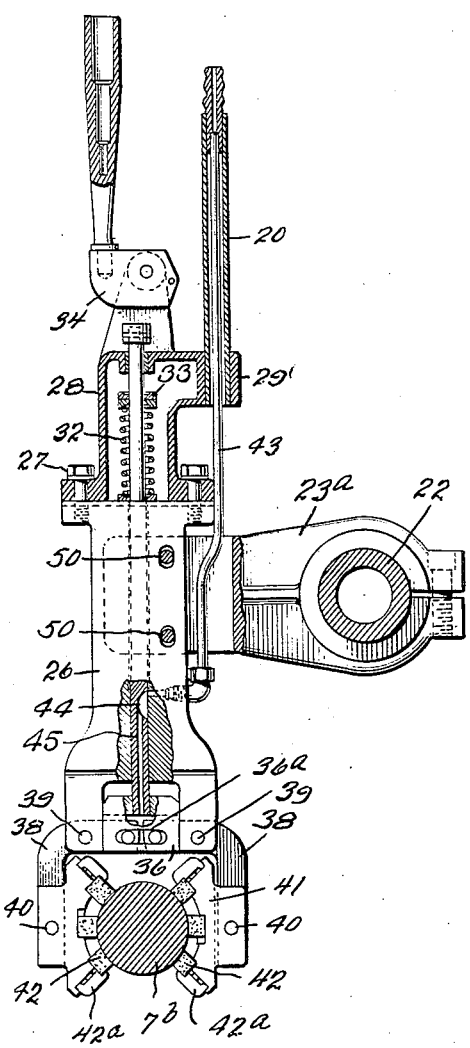
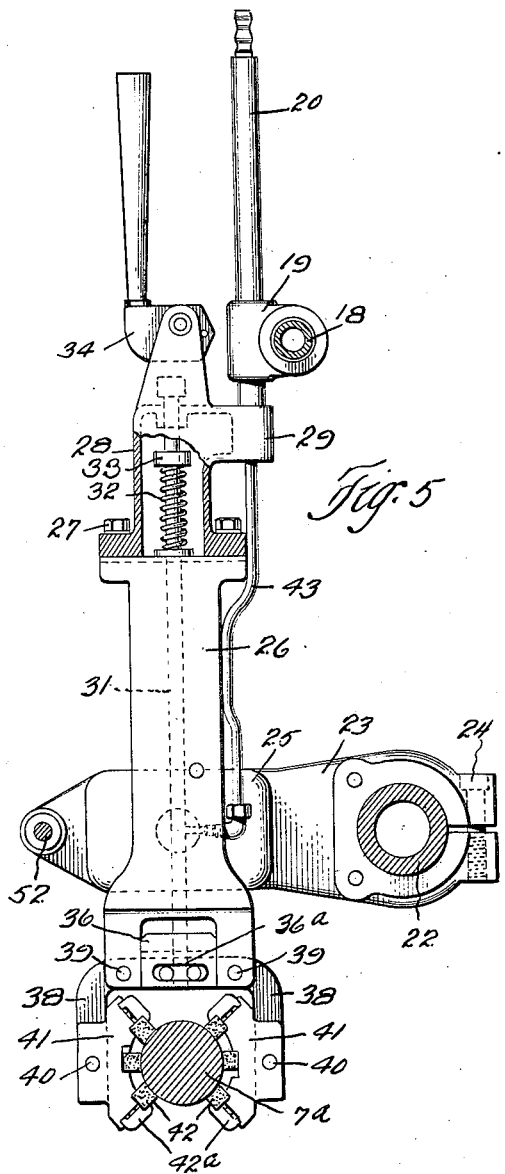

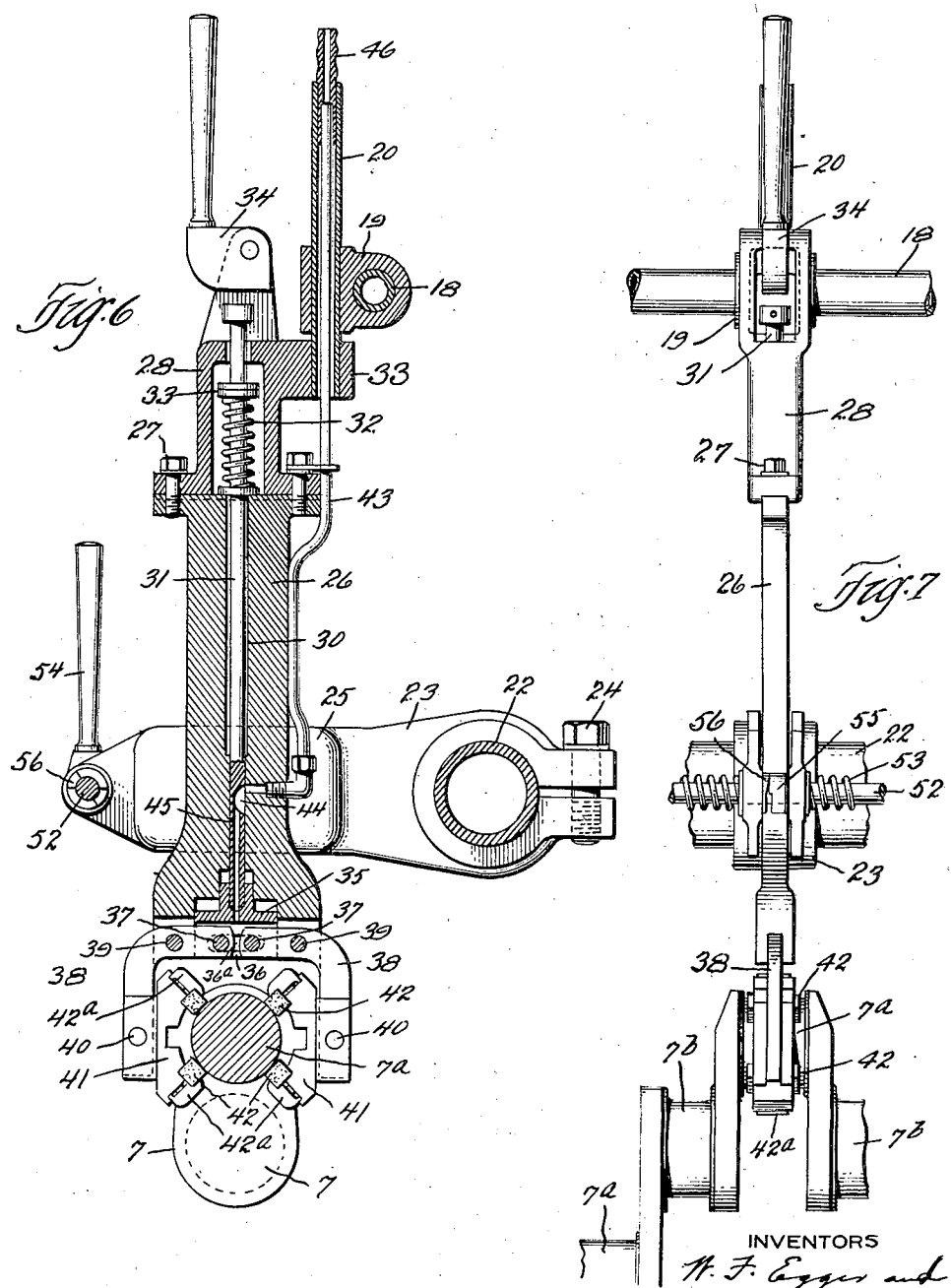

April 25, 1933. W. F. EGGER ET AL 1,905,825
MACHINE FOR HONING AND POLISHING CRANK SHAFTS
Filed July 18, 1927   15 Sheets-Sheet 7
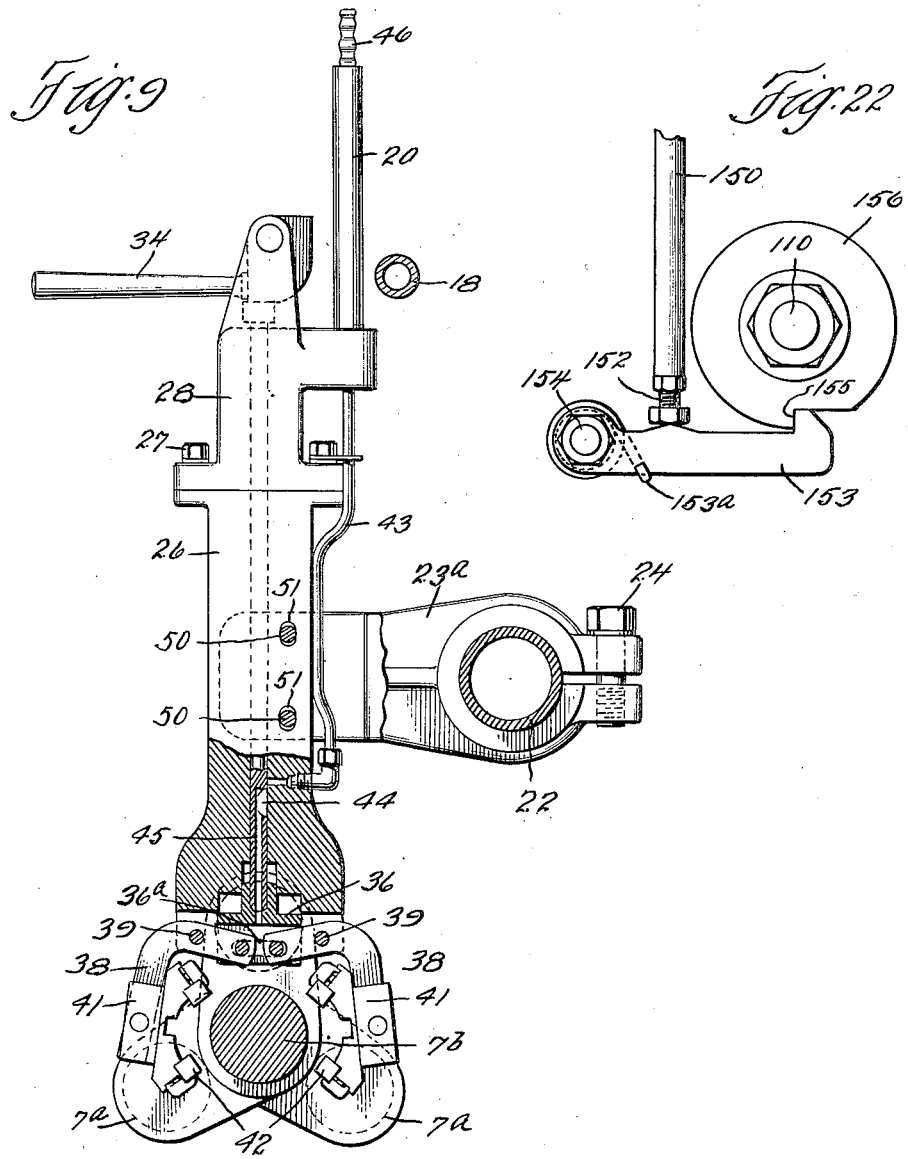
INVENTORS
W. F. Egger and
L. A. Becker,
By Hull, Brock & West.
Attys.

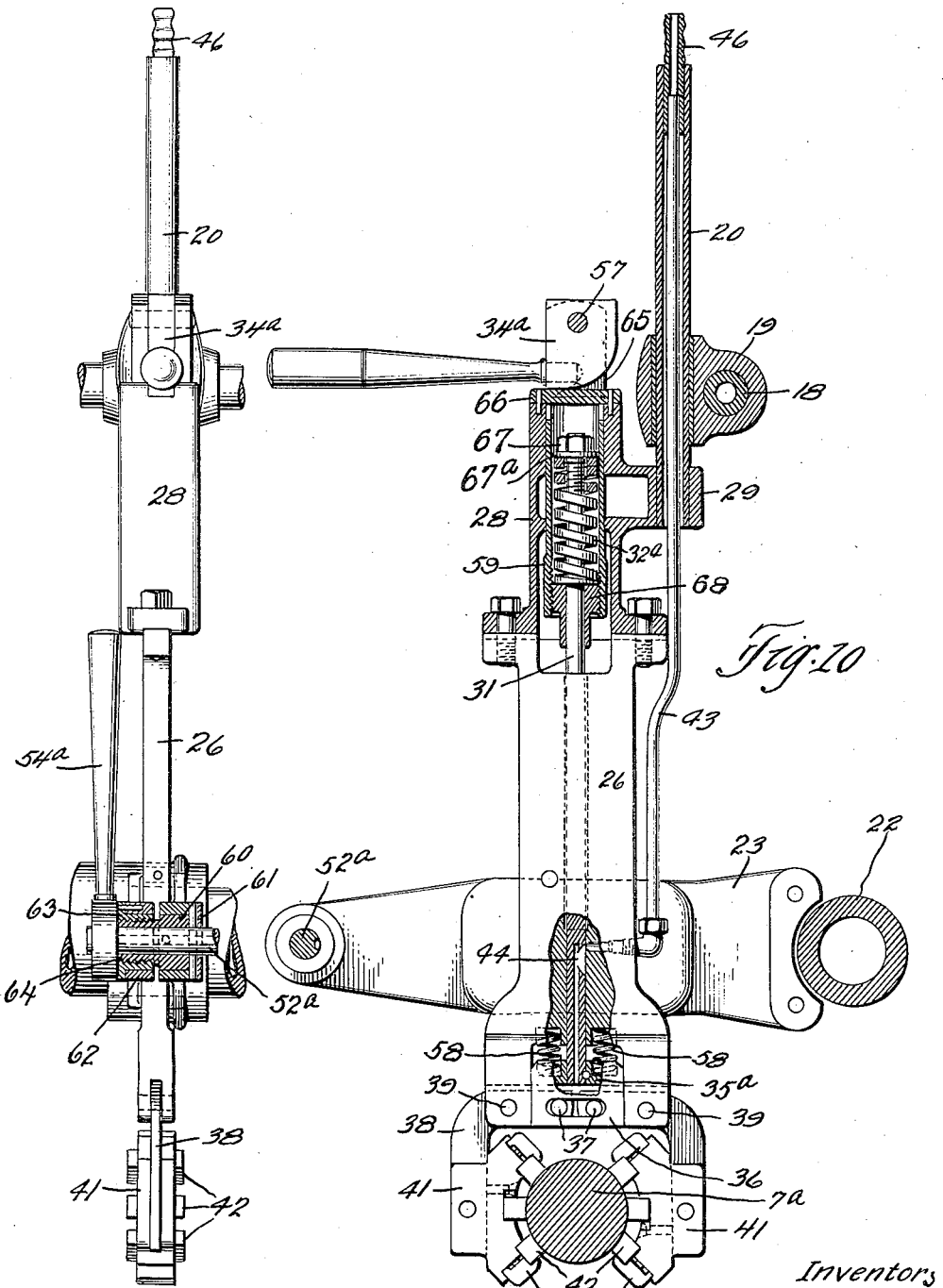

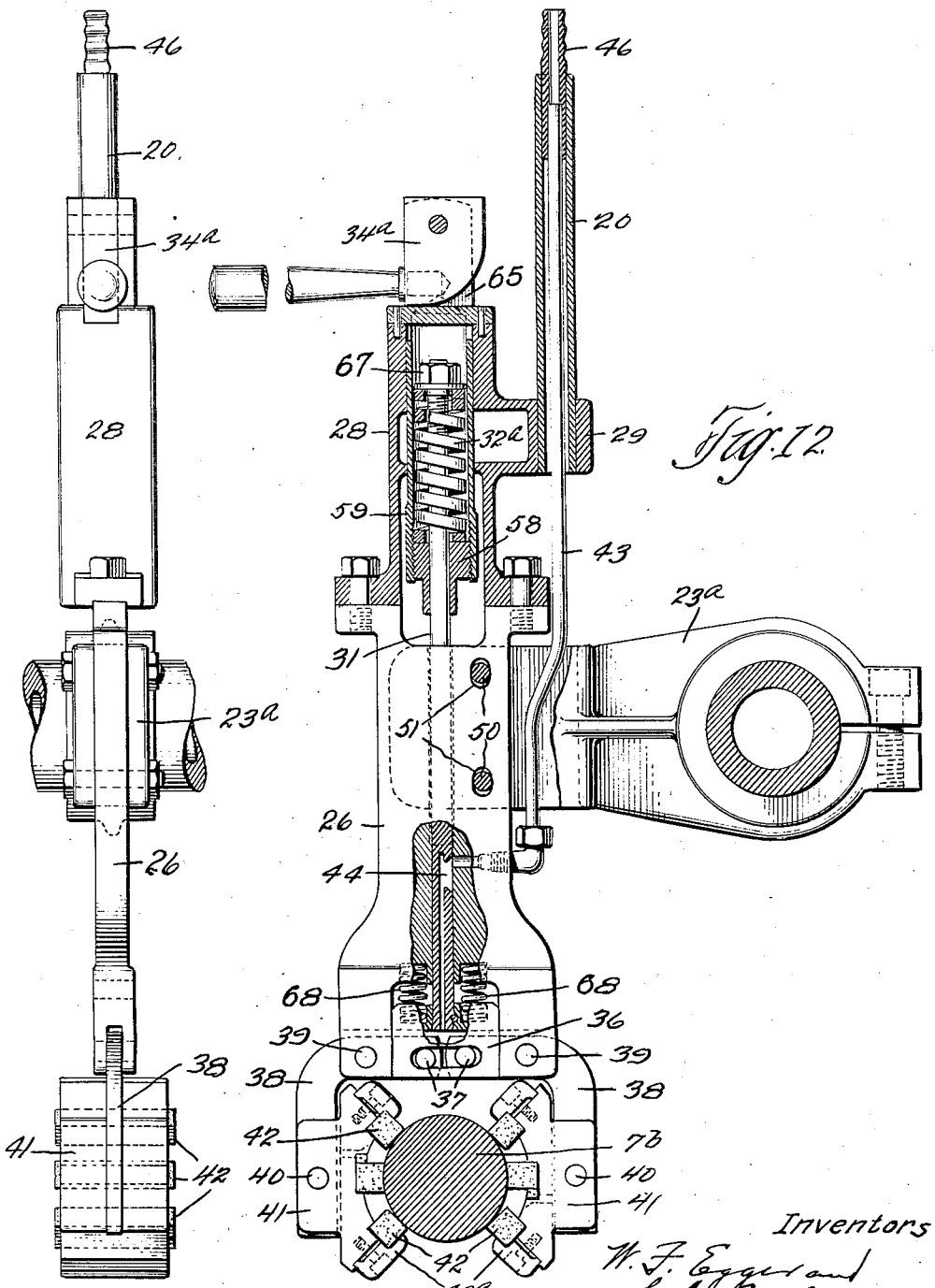

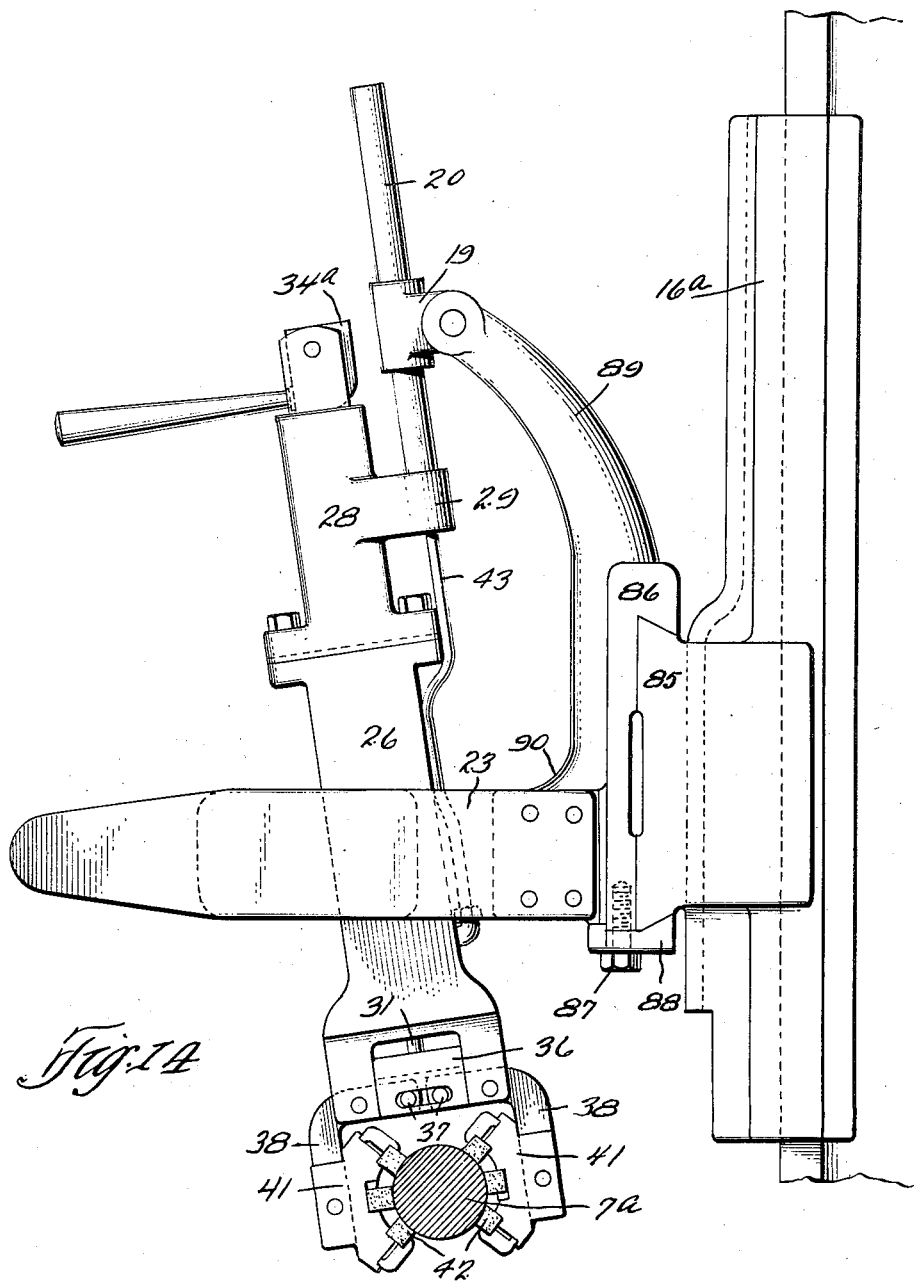

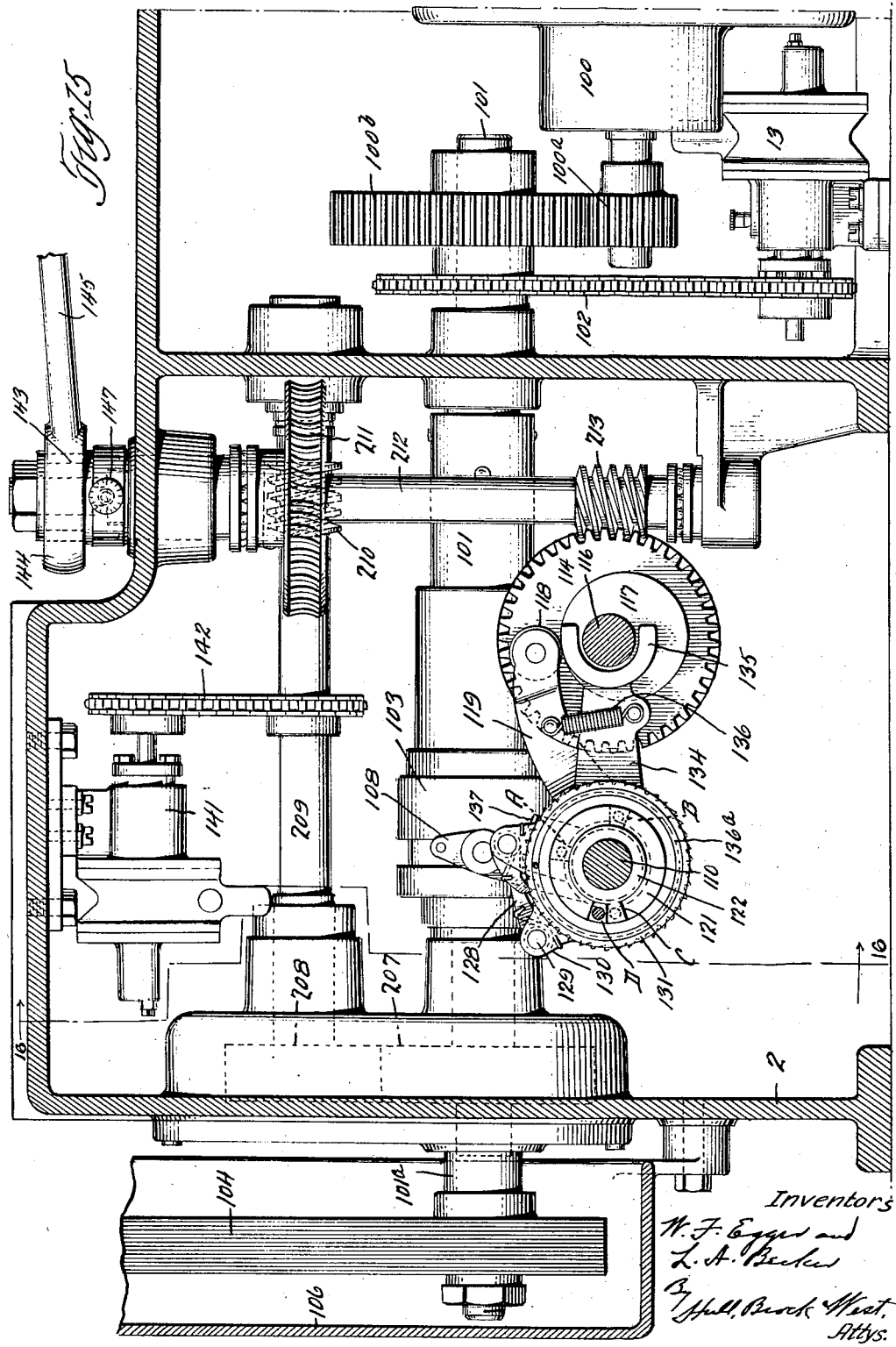

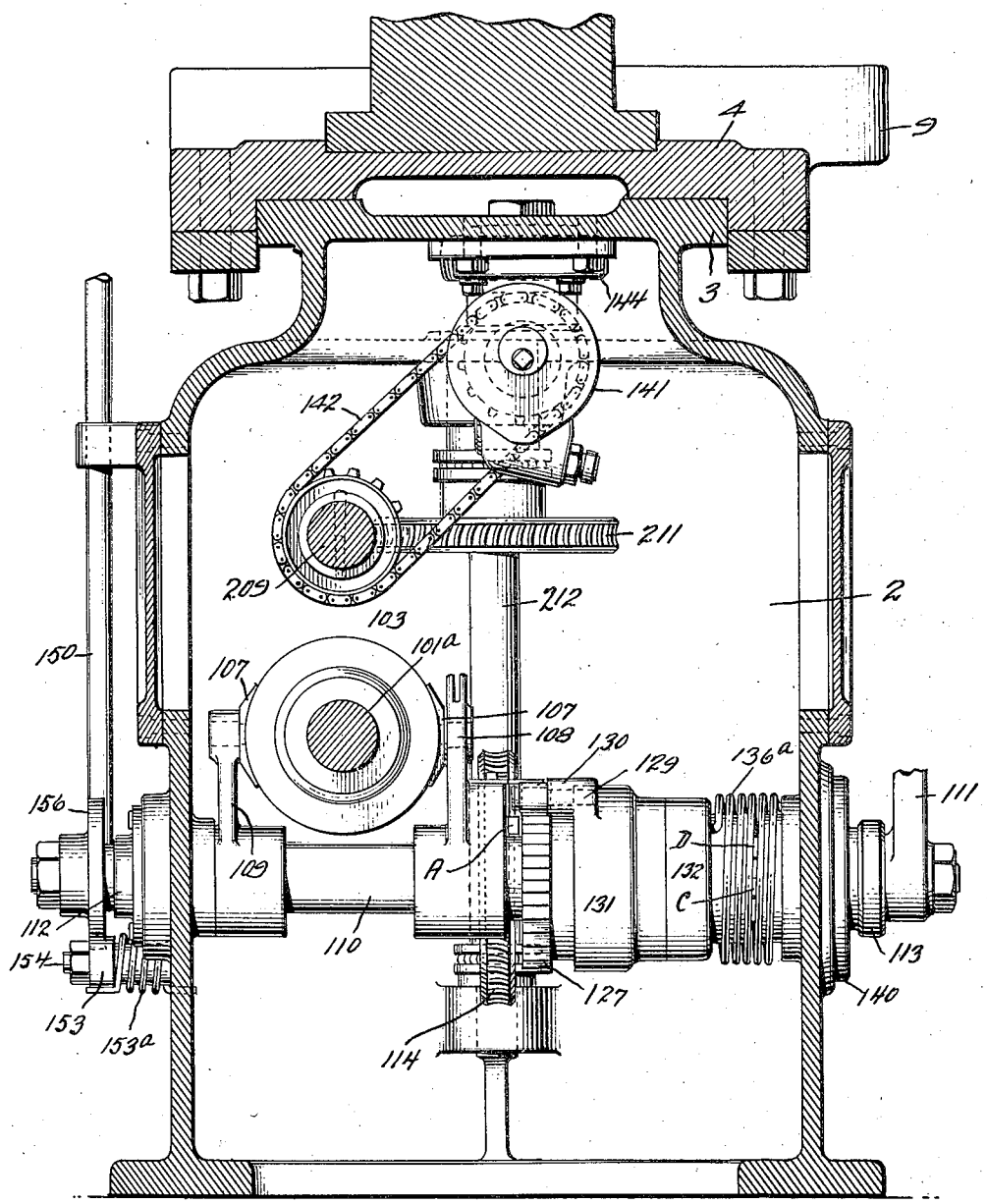

April 25, 1933.  W. F. EGGER ET AL  1,905,825
MACHINE FOR HONING AND POLISHING CRANK SHAFTS
Filed July 18, 1927    15 Sheets-Sheet 13
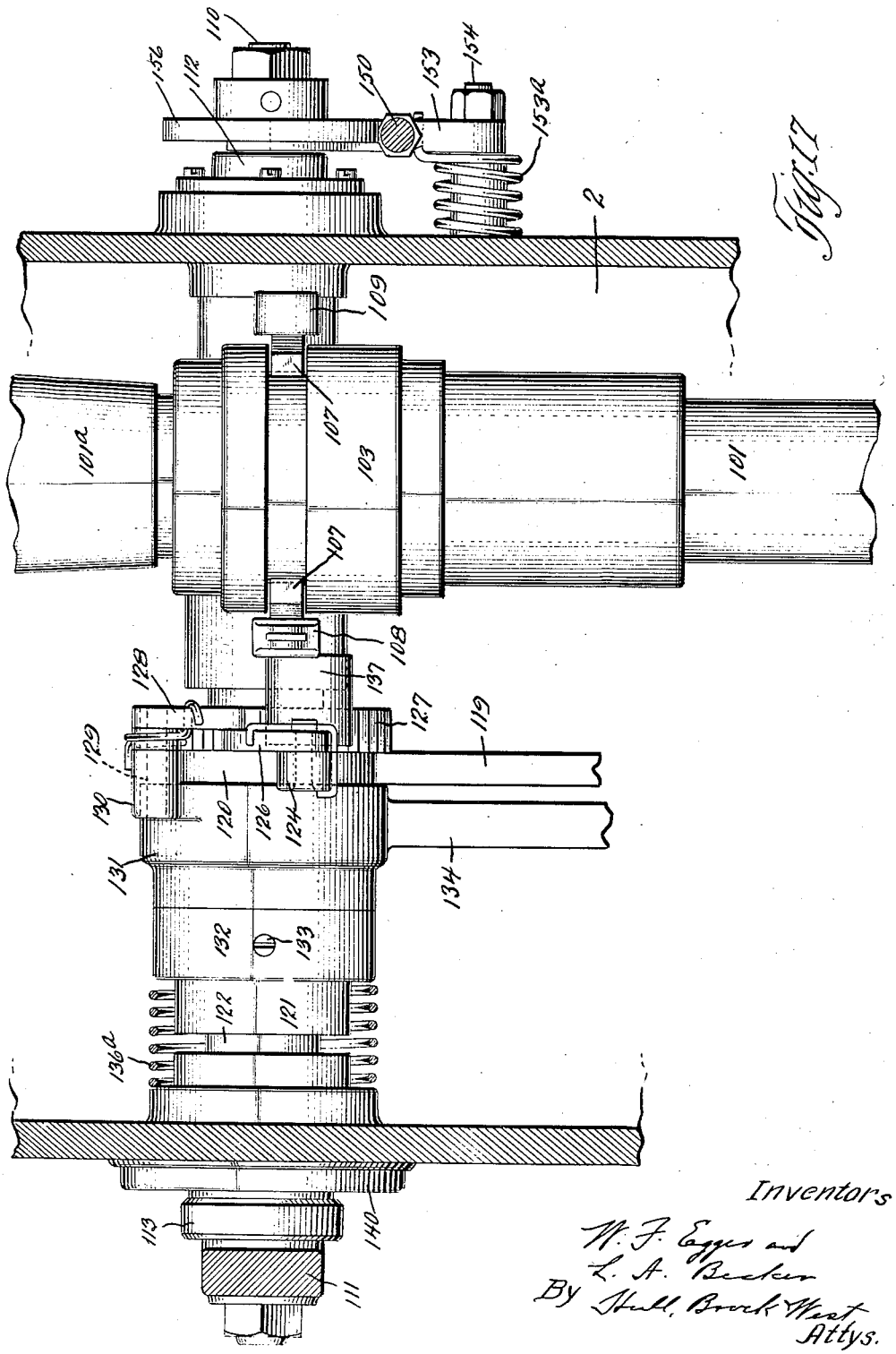

April 25, 1933. W. F. EGGER ET AL 1,905,825
MACHINE FOR HONING AND POLISHING CRANK SHAFTS
Filed July 18, 1927 15 Sheets-Sheet 14
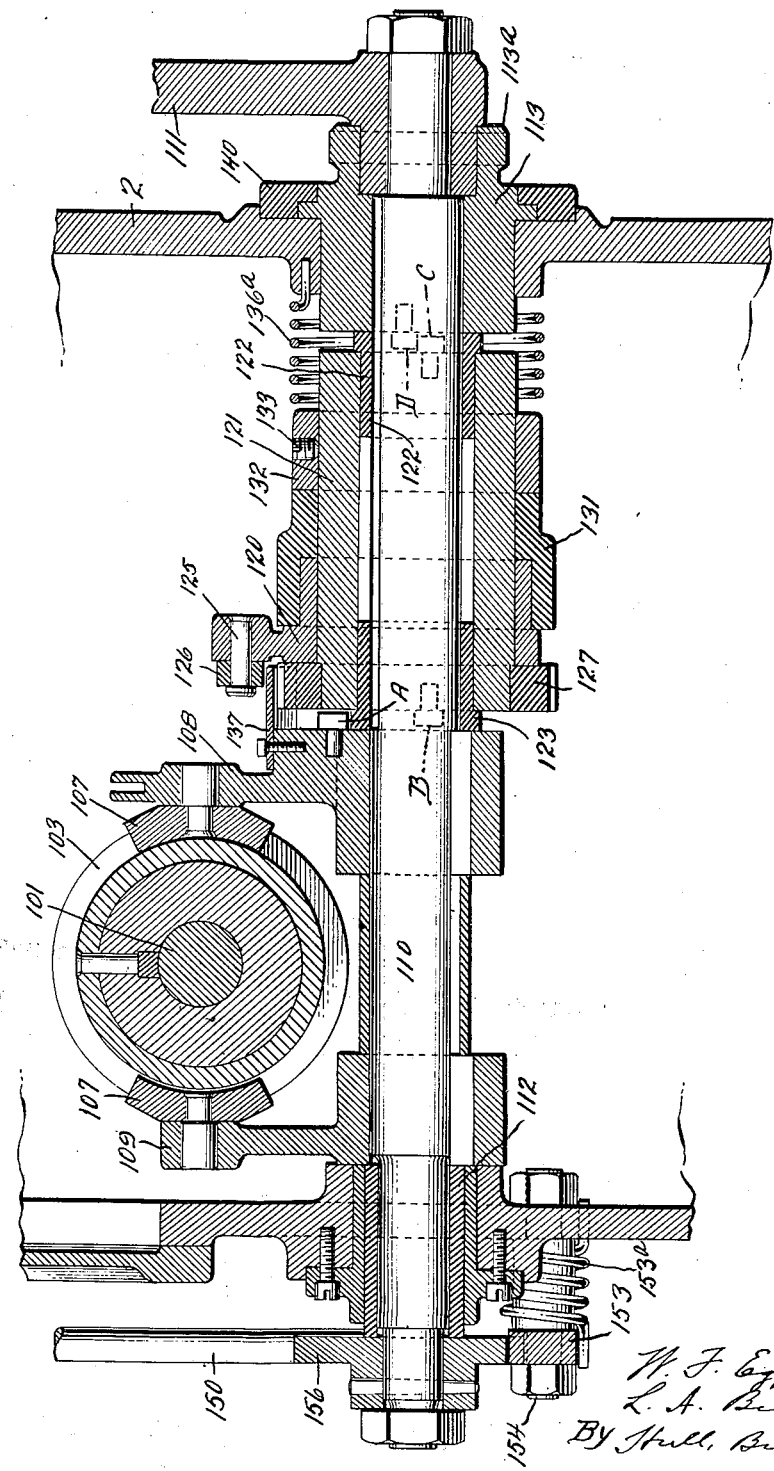

April 25, 1933. W. F. EGGER ET AL 1,905,825
MACHINE FOR HONING AND POLISHING CRANK SHAFTS
Filed July 18, 1927 15 Sheets-Sheet 15
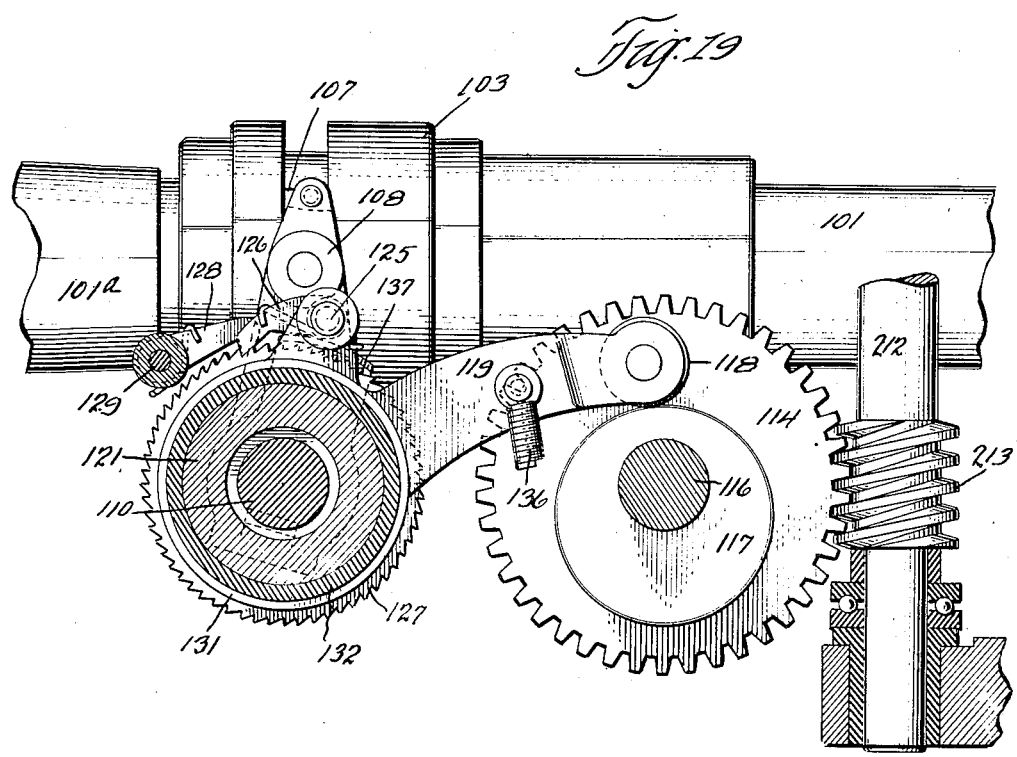
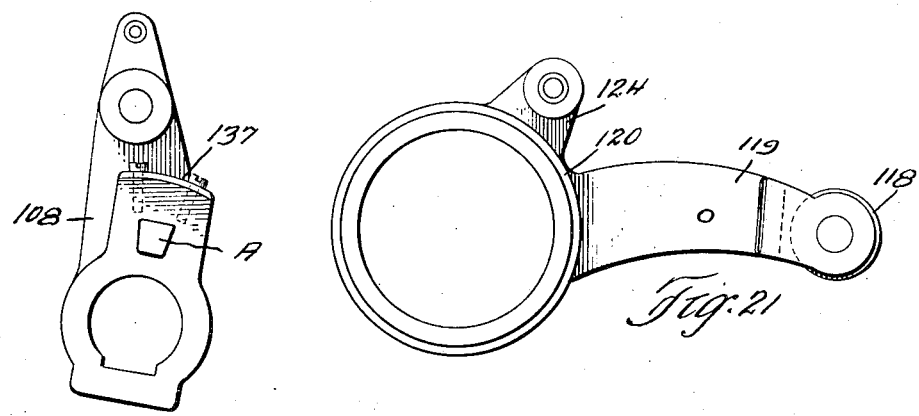

Patented Apr. 25, 1933

1,905,825

UNITED STATES PATENT OFFICE

WALTER F. EGGER, OF CLEVELAND, AND LOGAN A. BECKER, OF LAKEWOOD, OHIO, ASSIGNORS, BY MESNE ASSIGNMENTS, TO NORTON COMPANY, OF WORCESTER, MASSACHUSETTS, A CORPORATION OF MASSACHUSETTS

MACHINE FOR HONING AND POLISHING CRANK SHAFTS

Application filed July 13, 1927. Serial No. 206,515.

This invention relates to lapping machines for honing and polishing crank shafts and similar articles in which, as a rule, a plurality of eccentric bearings or surfaces have to be honed. In crank shafts, also, it is desirable or necessary to hone the concentric or main bearing surfaces, and this may be conveniently done at the same time as the honing of the crank pins.

The machine is of that type in which the several bearings are honed by means of honing tools or shoes which embrace the bearings and which partake of the throw thereof, being carried by sliding and swinging bars or carriers, so that the shoes follow the orbit of the cranks in the rotation of the shafts.

One of the objects of the invention is to provide a single machine wherein the operations of honing and polishing the surfaces may be accomplished simultaneously and in an efficient manner.

Another object of the invention is to form an improved machine of the vertical type, in which the honing-tool carriers are supported and guided on a frame adjustably mounted on a column at the back of the machine, whereby the tools can be raised or lowered to remove the same from or apply the same to the work, and to permit the work to be placed or removed from between the stocks by which it is rotated.

A further object of the invention is to provide means for supplying wash fluid, such as kerosene, to the surfaces being honed.

A further object of the invention is to provide means for giving the work a reciprocatory movement, in addition to its rotation, while it is being honed, so that the honing tools will reach the corners adjacent the cheeks of the cranks, and to prevent the formation of circumferential lines on the honed surface.

A further object of the invention is to provide means for collecting and circulating the liquid referred to, so that it may be used repeatedly.

A further object of the invention is to provide improved means for supporting and guiding the tool carriers so that they may accommodate themselves to crank shafts of different sizes and various lengths, the guides and supports being adjustable laterally for this purpose.

A further object of the invention is to provide an improved timing mechanism by means of which the machine will be caused to stop when the honing has proceeded for a desired length of time or number of revolutions.

A further object of the invention is to provide an improved safety device by means of which the machine cannot be started until the honing tools have been lowered to position in engagement with the surfaces to be honed.

Another object of the invention is to provide improved means for supporting and rotating the work while in operation.

A further object of the invention is to provide improved means, in connection with each of the tool carriers, for opening and closing the shoes or jaws which hold the stones, and to associate with such means a device which acts as a valve to control the supply of kerosene or other liquid to the surfaces being honed and polished, so that the supply is cut off when the machine is idle.

Although illustrated in connection with a machine for honing and polishing crank shafts, many of the improvements are applicable to machines for general grinding and analogous purposes.

One form of the invention is illustrated in the accompanying drawings, in which Fig. 1 is a front elevation of the machine; Fig. 2 is an end elevation, partly in section; Fig. 3 is a central vertical section; Fig. 4 is a horizontal section on the line 4—4 of Fig. 1; Fig. 5 is a sectional elevation of one of the tool carriers; Fig. 6 is a longitudinal section and Fig. 7 a front elevation of the same; Fig. 8 is a sectional elevation of one of the carriers for operating on the main bearings of the crank shaft; Fig. 9 is a similar view of the same, with the shoes in open position; Fig. 10 is a sectional elevation of a modified form of carrier; Fig. 11 is a front elevation of the same, partly in section; Figs. 12 and 13 are similar views of such modified form of carrier, adapted for the main bearings; Fig. 14 is a side elevation showing a modified form of support for the carriers; Fig. 15 is an elevation of the driving, timing and clutch mechanism in the base housing of the machine; Fig. 16 is a section of the same on the line 16—16 of Fig. 15; Fig. 17 is a detail in plan of the clutch and timing mechanism; Fig. 18 is a view of the same in section; Fig. 19 is a detail, partly in section, of the clutch and timing devices; Figs. 20 and 21 are details in elevation of parts of the timing mechanism; and Fig. 22 is a detail of a safety locking device.

Referring specially to the drawings, 1 indicates a base supporting a housing 2 for the driving or power mechanism. Slidable on guides 3 on top of this base is a bed 4 which carries a tail stock 5 of ordinary construction, and a head stock 6, between the centers of which the work or shaft 7 is held and rotated. Shiftable work-rests 8 are provided in which the crank shaft may be placed and swung in and out, to and from working position; and the bed includes an oil collecting pan 9 extending under the work, which discharges through a spout 10 into a hopper 11 from which it flows through proper pipe connections to a tank 12 in the housing, this tank being of the type having a settling compartment with an overflow to a clean-oil compartment from which the oil can be pumped by a pump 13 to a feeding and distributing system to be described hereinafter.

At the back of the housing, and behind the bed, is a hollow vertical post or support 14 having vertical guides 15 on which is mounted to slide vertically a frame 16 at the upper part of which are yoke arms 17 supporting a cross bar or shaft 18 on which are rockably mounted guide pieces or knuckles 19 which are adjustable along the shaft 18 and which have vertical bores for tubes 20 projecting upwardly from the tool carriers.

The ordinary crank shaft has a number of crank pins and also a number of main bearings, all of which are honed by the machine herein. The tool carriers which act on the crank pins have both a swinging and a sliding movement, while those which act on the concentric or main bearings have a sliding movement only. The former carriers are provided with the rocking connecting knuckles 19, as shown for example in Fig. 6. The latter are not, as will appear from Fig. 8, as the knuckles are unnecessary.

The knuckles 19 may turn on the bar 18 to accommodate the swinging movement of the tool carriers, and they also permit the sliding movements of the tubes 20 incident to the revolution of the cranks or the lift of the carriers.

The frame 16, below the yoke 17, is also provided with a pair of yoke arms 21 which support a shaft 22 on which are clamped sets of pairs of guide arms or plates 23 which may be adjusted along the shaft by loosening the clamping screws 24. There is a pair of guides for each carrier, and they have machined surfaces 25 between which the carriers work in sliding contact.

The carriers for the tools which act on the crank pins 7ª are somewhat different from those which act on the main bearings 7ᵇ. Both include a rectangular bar or plate 26 having a flanged upper end to which is bolted, as by bolts 27, a hollow head 28 having a rearwardly offset lug 29 in which a tube 20 is fixed. As stated, the tubes of the carriers for the crank-pin tools slide in the knuckles 19, while said knuckles are absent on the carriers for the main bearing tools. Each carrier has a central longitudinal bore 30 in which works a rod 31. In the form shown in Figs. 5 to 8, this rod is pressed upwardly by a spring 32 coiled around the same under a collar 33 thereon in the head 28, and the head has a hole at the top through which the rod projects in position to be acted on by a cam lever 34, which may be pulled down by hand to push the rod downward against the tension of the spring. The lower end of the rod is connected to a block 35 the side flanges 36 of which are connected by pin-and-slot connections 36ª and 37 to the ends of the bent arms 38 which are pivoted at 39 in a groove in the lower end of the carrier body 26, and each arm 38 has at its lower end a pivotal connection 40 to a shoe 41 in which the honing stones 42 are secured by the clamps 42ª. A plurality of stones are preferably used, and the pivots 40 permit a limited movement of the shoes so that they may accommodate themselves to the surface of the bearing being honed.

When the lever 34 is thrown down, the rod 31 presses down on the adjacent ends of the arms 38 and opens the shoes, so that they can be lifted from the work by sliding the carriers upwardly. When the lever 34 is swung up the spring 32 pushes up the rod and the shoes are swung to bring the hones into contact with the work.

Each carrier is provided with a pipe 43 which is tapped into the bore 30 in which the rod 31 works and communicates with a slot 44 at the upper end of a passage 45 which leads downwardly therefrom through the rod 31 and through the block 35 at the lower end thereof, in position to feed kerosene or other liquid to all the bearings being honed and polished. The slot 44 is of such size that it acts as a valve. When the rod is up, and the shoes are in contact with the work, the oil passage is open, as shown in Fig. 6. When it is pushed down, the passage is cut off and closed, as shown in Fig. 9.

The pipes 43 extend upwardly through the tubes 20 and are each provided at the top with a connection 46 to a hose or flexible pipe 47 which is connected to a manifold 48 to which oil is supplied by a pipe 49 from the pump 13. The oil may thus be fed to the honing tools or bearings, whence it drips to the pan 9 and is collected and returned to the tank for re-use by means of the pump 13, pipe 9 and manifold 48.

Since the tool carriers for the main bearings have little or no motion during the operation, the guides or supports 23$^a$ for the same are pinned thereto as by pins 50 (Figs. 8 and 9) which extend through enlarged holes 51 in the carrier to accommodate any slight movement incident to irregularities in the surfaces of the main bearings.

The guides 23, between which the carriers for the crank-pin tools work, are extended forwardly (see Figs. 4 and 5), and extending loosely through the front ends thereof is a shaft 52 on which is a set of coil springs 53 which press against the outer sides of the guides 23 and hold said guides against the machined sides of the carriers 26 with a spring pressure. To release this pressure the shaft 52 is provided with a lever handle 54, by which it may be rocked, and the shaft carries a set of cam collars 55 which act on cam faces 56 between the arms, so that when the shaft is rocked to proper position the cams force the guides apart and relieve their pressure on the sides of the tool carriers, and when the cam pressure is let off the springs return the guides to gripping contact with the sides of the carriers. When the tools are operating, the spring pressure is released, to decrease the friction. When the tools are not operating, the cams are released and the spring pressure acts to cause the guides to grip the carriers so that they may all be lifted from the work, as hereinafter described. It will be noted that this gripping action is absent from the guides or supports 23$^a$ of the carriers for the main bearing tools, as they have little or no movement in the supports, being connected by the pins 50 and slots 51.

In the modified form of carrier, shown in Figs. 10 to 13, the construction is similar except that the rod 31 extends through a bushing 58 screwed into a sleeve 59 which is slidable up and down in the head 28 and has extensions 65 projecting through slots in the cap 66 on the head, the spring 32$^a$ being confined between said bushing and a nut 67 and washer 67$^a$ on the upper end of the rod. A cam lever 34$^a$ is pivoted at 57 between the extensions 54 and bears on the cap 55. When the cam lever is swung up, it releases the pressure of the spring 32$^a$ and the rod is forced down by a pair of springs 68 bearing on the block 35$^a$ at the bottom thereof, thus acting to open the shoes. When the cam lever is swung down, the spring 32$^a$ lifts the rod and closes the shoes. Also, in this form, instead of using the spring-and-cam arrangement shown in Fig. 4, for the guides 23, the latter are pressed friction-tight against the sides of the carriers by means of a shaft 52$^a$ which may be turned by a handle 54$^a$. This shaft is keyed to the threaded bushing 60 which is carried in a boxing 61 at the end of one guide arm 23 of each pair, and the bushing screws into a threaded bushing 62 pinned as at 63 to a boxing 64 at the end of the other guide arm of the pair, so that when the shaft is rocked one way the guides are drawn together by the screw to clamp the same against the sides of the carriers 26, and when the shaft is rocked the other way the clamping pressure is released.

The form of carriers shown in Figs. 10 to 13 is considered superior to that shown in the preceding views, because the springs 32$^a$ are under tension only when the machine is in operation, and there is thus less chance of crystallization of the springs than is the case with those employed in the first form.

By the means described hereinbefore, the carriers are all supported and guided by the frame 16. This frame is counterbalanced by a weight 70 connected thereto by a chain 71 passing over a pulley 72 at the top of the hollow post 14 in which the weight is housed. For raising and lowering the frame 16 and the carriers mounted thereon, a hand wheel 73 is provided at the front of the machine, and its shaft 74 has a worm 75 which meshes with the worm wheel 76 on the shaft 77 having a beveled gear 78 meshing with a beveled gear 79 on the vertical screw shaft 80, supported behind the bed by bearings 81 and the cross frame 82, the shaft 80 having a screw portion 83 thereof which engages a nut 84 fixed in the frame 16. By operation of the hand wheel, the frame and the carriers mounted thereon may be raised or lowered from or to the work, the sliding carriers 26 being first clamped between the guides friction-tight, by either of the means above described.

As stated hereinbefore, the clamping connection between the guides and the shaft 22 permits the tools to be adjusted laterally, according to the work in hand. Instead of the means described above, the modification shown in Fig. 14 may be used. In this form the vertical sliding frame 16$^a$ has a lateral guide 85 extending across the same, and a series of brackets 86 may be adjusted along this guide and clamped thereto by screws 87 and clamping pieces 88 carried by the brackets. Each bracket has an upper arm 89 which supports the pivoted knuckle 19 and a lower arm 90 to which the guides 23 are fixed. Adjustment of the brackets laterally will properly locate the parts with reference to the particular work at hand, without the use of the shafts 18 and 22 above described.

The power for the machine is derived from a motor 100 which is geared to a shaft 101 by gears 100$^a$, 100$^b$, from which shaft 101 the pump 13 is driven by a chain 102 and suitable sprockets (see Fig. 15). The shaft 101 is made in two sections, with a clutch 103 between the same, and from the driven section 101ª a silent chain 104 drives the main sprocket 105 of the head stock by which the work is rotated (see Fig. 2). The chain is enclosed in an extension 106 on the housing 2. The clutch 103 is of a known type which, after being started out of engagement, will automatically complete its disengagement, and its outer or operating sleeve is shifted by shoes 107 running in the groove therein and carried by two arms 108 and 109 keyed to the rock shaft 110 which is provided at its outer end, outside the housing, with a hand lever 111. The shaft 110 extends through the housing, being supported at its rear end by a bearing 112 and at its front end by a dial piece 113 set in the housing walls. It is intended that the clutch shall be thrown in by hand and that it shall be thrown out automatically by a timing mechanism now to be described, after a certain period or number of revolutions of the work, said number being adjustable as desired.

The driven section 101ª of the main shaft carries a gear 207 which drives a gear 208 on a counter shaft 209 which has a worm 210 driving a worm wheel 211 on a vertical shaft 212 having a worm 213 driving a worm 114 on a cross shaft 116 which has a cam 117 thereon bearing against a roller 118 at the end of an arm 119 projecting from a collar 120 mounted on a sleeve 121, which may turn on bushings 122 and 123 on the shaft 110. The collar 120 has a projection 124 to which is pivoted, by a pin 125, a pawl 126 which engages the teeth of a ratchet wheel 127 to rotate said wheel one way, said wheel being keyed on the sleeve 121. Another pawl 128 is engageable with the ratchet wheel to prevent back slip thereof, this latter pawl being supported by a pivot 129 on an arm 130 projecting from an outer housing or sleeve 131 mounted loosely on the sleeve 121 and retained by a collar 132 fixed by a pin 133. The sleeve 131 has an arm 134 with a fork 135 which spans the shaft 116, whereby the sleeve 131 is prevented from turning. A spring 136 connected between the arms 119 and 134 keeps the roller 118 against the cam 117. A coil spring 136ª is fastened at one end to the wall of the housing 2 and at the other end to the collar 132 and consequently to the sleeve 121, and this spring when placed under tension will tend to return the sleeve 121 in clockwise direction when the pawls are released from the ratchet wheel.

At its front end the sleeve 121 has a stud or projection C (Fig. 15) and at its rear end a stud or projection B. On the side of the arm 108 facing the front is a stud or projection A which is adapted to be struck at a certain time by the stud B to throw out the clutch by swinging the arm 108 and consequently rocking the shaft 110, when the sleeve 121 shall have been turned sufficiently for that purpose. When the clutch is so thrown out a plate 137, carried by the arm 108, enters under the points of the pawls 126 and 128 and lifts them from contact with the ratchet wheel, and when the ratchet wheel is so released, the spring 136ª will return the sleeve 121 to its original position. The sleeve 121 is turned forwardly, or in counter-clockwise direction, as the work is rotated by means of the cam 117 and the pawl 126 operated thereby, and when the stud B picks up the stud A, the clutch shaft will be rocked to throw out the clutch and thereby stop the machine; and by the same action, the pawls, especially the detent pawl 128, will then be released to allow the sleeve 121 to resume its original position. Therefore, the machine is caused to operate accordingly for the time required to turn the sleeve 121 to the throw out position. This time may be varied according to the original position at which the sleeve 121 is set, which position determines the extent of rotary movement imparted to the sleeve before its stud B engages the stud A.

For this purpose, the dial member 113 is set friction tight under a ring 140 fastened to the wall of the housing 2, but the dial member may be turned and set by an effort sufficient to overcome such friction. On the rear end of the dial member is a stud D which acts as a stop against which the stud C on the sleeve 121 strikes when the sleeve is turned back by the action of the spring 134. By varying the set of the dial member, this stop D may be located in any desired position. When the sleeve 121 springs back, the lug C strikes the stop D, and it is at this selected point, then, that the ratchet mechanism begins the turn of the sleeve which finally results in throwing out the clutch. The farther back the sleeve is allowed to return before the lugs C and D engage, the longer the time which will be required to turn the sleeve to the throw-out position. Variation, therefore, of the set of the dial determines the period that the machine shall continue in operation. When the arm 108 swings to the left in Fig. 15 to throw out the clutch, the lever 111 is restored to its original position. For the next operation, the lever 111 is moved to the right sufficiently to throw the clutch in, and this action withdraws the plate 137 to the position shown in Fig. 19, allowing the pawls to drop into the ratchet teeth for the next operation.

The counter-shaft 209 may be used to drive an oil pump 141 for lubricating purposes, by means of a driving chain 142.

In addition to its functions as before described, the vertical shaft 212 extends through the top of the housing 2 where it is provided with an eccentric 143 the strap 144 of which is connected by a rod 145 to a pin 146 on the under side of the bed 4, and as the eccentric rotates the bed 4 is reciprocated to a slight extent, whereby the tools will be caused to act in the corners of the crank shaft being honed, close up to the cheeks thereof. The throw of the eccentric may be varied by an adjusting device indicated at 147, to vary the reciprocation of the work. Suitable bearings and supports are provided in the housing for the power and timing mechanism above described.

It is essential, or at least desirable, that means be provided to prevent the clutch being thrown in when the tools are out of contact with the work, and for this purpose I provide a rod 150 (see Figs. 2, 18 and 22), which is fastened at its upper end to the sliding frame 16 and works through the guide 151 on the back of the housing and has at its lower end an adjustable screw 152 which rests against a catch 153 pivoted at 154 on the back of the housing and normally held in engagement by a spring 153a with a notch 155 in a wheel 156 fixed to the rear end of the rock shaft 110. When the frame 16 is raised to lift the tools from the work the catch engages the wheel 156 and prevents the shaft 110 being turned to throw in the clutch. When the frame is lowered, engaging the tools with the work, the rod 150 throws the catch 153 out and the clutch can then be thrown in. This prevents wrecking which might occur if the clutch were thrown in while the tools are in raised position.

The operation of the machine is believed to be sufficiently evident from the above description but it may be briefly stated as follows:

When the tools are lifted by means of the hand wheel 73, which lifts the frame 16, the crank shaft to be honed and polished is placed on the work rest and swung in between the head and tail stocks and duly centered and clamped. The frame 16 is then lowered, the shoes being open, as shown in Fig. 9. By proper operation of the respective hand levers 34 the arms 38 are then swung to allow the shoes to close the hones against the bearings of the work. The clamping guides 23 are then released by operation of the hand lever 54 or 54a, according to the type of clamp used. The clutch 103 is then thrown in by swinging the lever 111 to the right, and the machine starts. The shoes having a grip on the pins to be honed follow the revolution thereof, the carriers therefor sliding and swinging between the guides 23, the knuckles 19 rocking on the shaft 18 and the tubes 20 sliding in the knuckles. The timing mechanism which governs the clutch operates in due time to throw out the clutch and stop the machine, after which the shoes are opened, the frame and tools lifted, and the work removed. While the tools are operating, kerosene or other desired fluid is pumped through the carriers onto the work, and then conducted back to the pump. When the machine is stopped and the frame and tools lifted, the shoes will be open and ready to engage a new and similar piece of work, when lowered; and they are clamped in such elevated positions by manipulating the lever 54. Then when a new piece of work is inserted and the tools are lowered, the hones will all fit the respective pins to be polished and do not have to be reset or adjusted. The main bearings, being concentric, are, of course, all engaged properly by the shoes in all positions. For crank shafts of different dimensions, the guides or supports may be adjusted along the shafts 18 and 22 to properly register the tools.

The invention is not limited to the particular devices shown but many variations may be made within the scope of the following claims.

Having thus described our invention, what we claim is:—

1. In a machine of the kind described, the combination, with means for supporting and rotating a crank shaft, of a tool carrier having a tool adapted to operate on a crank pin on said crank shaft, a pivotal support for the end of the tool carrier opposite said tool, and a guide adapted to slidably engage the carrier between the ends thereof as said carrier is reciprocated by said crank pin, said guide comprising side plates and means to move the plates laterally to clamp the carrier therebetween and hold it in a fixed position.

2. In a machine of the kind described, the combination, with means for supporting and rotating a crank shaft, of a tool carrier having a tool adapted to operate on a crank pin on said crank shaft, a pivotal support for the end of the tool carrier opposite said tool, and a guide adapted to slidably engage the carrier between the ends thereof as said carrier is reciprocated by said crank pin, said guide comprising a pair of side plates engaging opposite sides of the carrier, and means to clamp the plates against the carrier and hold it fixed in any desired position.

3. In a machine of the kind described, the combination, with means to support and rotate a crank shaft, of a plurality of sliding and swinging tool carriers arranged side by side, guides for said carriers each comprising a pair of plates engaging opposite sides of the respective carriers, and means to simultaneously clamp all the guides against the carriers.

4. In a machine of the kind described, the combination, with means to support and rotate a crank shaft, of a plurality of sliding and swinging tool carriers arranged side by side, guides for said carriers each comprising a pair of plates engaging opposite sides of the respective carriers, and means to simultaneously clamp all the guides against the carriers, said clamping means comprising a shaft extending through the plates, and screws on the shaft between the plates of each pair, to clamp the same by rocking the shaft.

5. In a machine of the kind described, the combination, with means to support and rotate a crank shaft, of a plurality of sliding and swinging tool carriers arranged side by side, guides for said carriers each comprising a pair of plates engaging opposite sides of the respective carriers, and a rock-shaft extending through the plates, springs between the pairs of plates and tending to clamp the plates of each pair against a carrier, and means on the shaft to spread the plates against the pressure of the springs.

6. In a machine of the kind described, the combination with means to support and rotate a crank shaft, of a slidable frame, a set of sliding and swinging tool carriers mounted on said frame, means for securing the tools to the frame, and means to slide the frame to move the tool carriers to and from the shaft.

7. A lapping machine comprising means to support and rotate a work piece having a plurality of work surfaces thereon, a set of lapping devices, means including a support for holding the devices in operative relation to said surfaces during rotation of the work piece, clamping means for simultaneously securing all of said devices to the support, whereby each may be held in fixed angular relation to the work, and means to move the support and simultaneously remove all of the devices from the work upon completion of the lapping operation.

8. A lapping machine comprising means to support and rotate a work piece having a plurality of work surfaces thereon, a set of tool carriers, each having two shoes relatively movable towards and from opposite sides of a work surface therebetween, means for simultaneously positioning the carriers so that all of the shoes are adjacent to the work surfaces, and means for moving the shoes towards each other into operative association with the work for a lapping operation.

9. A lapping machine comprising a rotary work support, a set of longitudinally movable tool carriers, each having a pair of shoes at its end arranged to be moved to and from lapping association with the work therebetween, means on each carrier to open and close its shoes and move them from an open to a lapping position, and means to simultaneously shift the whole set of tool carriers toward and from the work while the shoes are in their open positions and thereby maintain each set of shoes in positive alignment with said open positions for return to their respective lapping positions.

10. A lapping machine comprising a support for rotating a work piece, a lapping device movable towards and from the work center, a carrier therefor including a hollow reciprocable member arranged for supplying fluid to the work, a frame having a support through which said member reciprocates, and means for supplying liquid to the hollow member.

11. A lapping machine comprising a rotatable work support, a lapping tool movable towards and from the work, a cam controlled device to move the tool away from the work, a fluid system including a valved pipe to feed fluid to the work, and means connecting the cam with the valve for closing the same when the tool is removed from the work.

12. A lapping machine comprising the combination of a rotatable work support and a carrier, a movable work engageable shoe on the carrier, cam operated mechanism to disengage said shoe from the work, a fluid feeding system including a passage through the carrier which communicates with the work surface, and means controlled by movement of said cam for stopping the fluid flow through said passage.

13. In a crank shaft abrading or honing machine, in combination, a bed, means thereon to support and rotate a crank shaft, a vertical post at the back of the bed, a frame adjustable up and down on the post, a set of tool carriers pivotally and slidably supported at their upper ends on the frame, guides projecting from the frame, in which the carriers slide, means to clamp said guides against the carriers and prevent said sliding motion of the carriers, and means to adjust the frame vertically.

14. In a crank shaft abrading or honing machine, in combination, a bed, means thereon to support and rotate a crank shaft, a vertical post at the back of the bed, a frame adjustable up and down on the post, a set of tool carriers pivotally and slidably supported at their upper ends on the frame, guides projecting from the frame, in which the carriers slide, means for preventing or permitting longitudinal movement of the carriers relative to the guides, means to adjust the frame vertically, and means to reciprocate the bed axially of the shaft during the work rotation.

15. In a crank shaft abrading or honing machine, the combination of a bed provided with means for supporting and rotating a crank shaft, a vertical post behind the bed, a frame slidable up and down on the post, clamping guides projecting forwardly from the frame and over the bed, tool carriers slidable in said guides and provided at their lower ends with shoes movable into engagement with the shaft bearings to be abraded or honed, means to clamp the carriers in the guides, whereby they may be lifted with the frame, and means to raise and lower the frame.

16. In a crank shaft abrading or honing machine, the combination of means for supporting and rotating a crank shaft, a plurality of tool carriers each having means for engaging and abrading or honing a crank pin of such shaft, a cross bar, sleeve devices loosely mounted on said cross bar, tubes carried by the upper ends of the carriers and extending through the said devices and constituting part of a conduit for supplying wash liquid to the tools and work, guiding means adapted to engage the sides of the tool carriers as they are reciprocated by the rotation of the crank shaft, and flexible conduits connected with the said tubes for supplying wash liquid thereto.

17. A tool carrier comprising a slidable bar, a pair of opposed shoes pivoted to the bar, a spring-pressed rod slidable in the bar and connected to the shoes and tending to close the shoes on the work, and means to shift the rod to open the shoes.

18. A tool carrier comprising a slidable bar, a pair of opposed shoes pivotally connected to one end of the bar, a rod working lengthwise in the bar and operatively connected at one end to the shoes to open and close the same, a spring pressing the rod to close the shoes, and a lever at the other end of the bar, operable for opening the shoes.

19. A tool carrier comprising a slidable bar, a pair of opposed shoes pivotally connected to one end of the bar, a rod working lengthwise in the bar and operatively connected at one end to the shoes to open and close the same, a spring pressing the rod to close the shoes, and a lever at the other end of the bar, operable for opening the shoes, the bar having a sleeve therein to which the lever is connected and into which the rod extends, the spring being confined in the sleeve.

20. A tool carrier comprising a slidable bar, a pair of bent arms pivoted to the end of the bar, opposed shoes at the outer ends of said arms, adapted to embrace work therebetween, a rod mounted on the bar and bearing against the inner ends of said arms and movable to spread the shoes, means to advance the rod for that purpose, and a spring tending to retract the rod, to close the shoes against the work.

21. A tool carrier comprising a slidable bar, a pair of opposed shoes on the bar, a rod slidable in the bar for opening and closing said shoes, and means controlled by the movement of said rod for supplying fluid to the work between said shoes.

22. A tool carrier as set forth in claim 21 including a passage in the bar for the said fluid opened and closed by the movement of said rod.

23. A tool carrier as set forth in claim 21 including a passage in said rod for the said fluid and a port in the bar for supplying said fluid to said passage and opened and closed by the movement of said rod.

24. A lapping machine comprising a rotatable work support, a tool carrier including a slidable bar, a pair of opposed work engaging shoes pivoted to the bar, a spring-pressed rod slidable in the bar and tending to close the shoes on the work, means to shift the rod for opening the shoes, and means to supply fluid to work between the shoes, the said means including a passage in the rod arranged to be opened and closed by the movement of the rod.

25. A crankshaft lapping machine comprising a rotating work holder, means to drive the same including a clutch, a tool supporting frame movable toward and from the work, a lapping tool engageable with the work which slides through the frame, means to affix the tool to the frame for movement away from the work and means actuated by movement of said frame to remove the tool from the work which prevents closure of the clutch when the tool is away from the work.

26. The combination of a rotating work holder, means including a clutch to rotate the same, a rock shaft operatively connected to the clutch to open or close the same, a sliding frame, a tool slidably carried by the frame and movable toward and from the work, means to affix the tool to the frame, a latch engageable with the rock shaft, and a rod carried by the frame and engageable with the latch to release the same when the tool is applied to the work.

27. A lapping machine comprising a rotatable work carrier, lapping devices engageable with the work, clutch mechanism which may be disengaged to stop the work rotation, a clutch actuating device, a timing mechanism including an adjustable member connected to operate said device and disengage the clutch, means actuated by the work rotating mechanism to operate said timing mechanism, and means to regulate the position of said member and determine when the clutch mechanism may be actuated, whereby the work rotation may be stopped after a predetermined but variable number of rotations.

28. A lapping machine of the type covered by claim 27 comprising means to prevent closing of the clutch when the lapping devices are remote from the work.

29. A crankshaft lapping machine comprising means for rotatably supporting a shaft, a set of non-rotatable lapping devices operatively associated with the shaft bearings for lapping the same as it rotates, means including a clutch for rotating the shaft and reciprocating it axially relative to the lapping devices, and means operated in timed relation with the rotation of said shaft including a timing device which serves to disconnect said clutch and stop the rotation and reciprocation of the shaft after a predetermined number of rotations thereof.

30. A lapping machine of the type covered by claim 29 comprising an adjustable member associated with the timing device which determines the number of rotations of the crankshaft prior to operation of the clutch.

31. The combination with a crankshaft abrading or honing mechanism, said mechanism including means for rotating the shaft while being abraded or honed, of a variable timing mechanism directly controlling the means for rotating the shaft and automatically operable to stop such rotation, and manually operated means for starting such rotation, said rotating means including a clutch, and said timing mechanism including a throw-out device for the clutch.

32. The combination, with means including a clutch for rotating a piece of work, of a timing mechanism operating directly to throw out the clutch, said mechanism including a rock shaft, a sleeve on the shaft, a pick-up device carried by the sleeve and constructed to rock the shaft when said sleeve and device reach a certain position, means actuated by a driven part to turn the sleeve step by step, and means to automatically return the sleeve to original position when the clutch is thrown out.

In testimony whereof, we hereunto affix our signatures.

WALTER F. EGGER.
LOGAN A. BECKER.